(12) United States Patent
Jiang

(10) Patent No.: US 7,298,768 B1
(45) Date of Patent: Nov. 20, 2007

(54) THULIUM-DOPED HEAVY METAL OXIDE GLASSES FOR 2UM LASERS

(75) Inventor: Shibin Jiang, Tucson, AZ (US)

(73) Assignee: NP Photonics, Inc, Tucson, AZ (US)

( * ) Notice: Subject to any disclaimer, the term of this patent is extended or adjusted under 35 U.S.C. 154(b) by 508 days.

(21) Appl. No.: 10/990,869

(22) Filed: Nov. 16, 2004

(51) Int. Cl.
*H01S 3/17* (2006.01)

(52) U.S. Cl. .......................... 372/40; 372/6

(58) Field of Classification Search ............ 372/41, 372/71, 6, 102, 5
See application file for complete search history.

(56) References Cited

U.S. PATENT DOCUMENTS

| | | | |
|---|---|---|---|
| 4,965,803 A * | 10/1990 | Esterowitz et al. ............ 372/5 |
| 4,969,150 A | 11/1990 | Esterowitz et al. | |
| 5,067,134 A | 11/1991 | Oomen | |
| 5,291,501 A | 3/1994 | Hanna | |
| 5,311,532 A | 5/1994 | Belt et al. | |
| 5,381,433 A | 1/1995 | Esterowitz et al. | |
| 5,406,410 A * | 4/1995 | Hanna et al. ............ 359/341.5 |
| 5,457,706 A | 10/1995 | McGuckin et al. | |
| 5,459,745 A | 10/1995 | Esterowtiz et al. | |
| 5,640,408 A | 6/1997 | Jani et al. | |
| 5,742,632 A | 4/1998 | Barnes et al. | |
| 5,796,903 A | 8/1998 | Tran | |
| 6,476,960 B1 * | 11/2002 | Traynor et al. ........ 359/341.31 |
| 6,589,895 B2 | 7/2003 | Dejneka et al. | |

OTHER PUBLICATIONS

Tetsumi Sumiyoshi et al., Dual-wavelength continuous-wave cascade oscillation at 3 and 2 um with a holmium-doped fluoride-glass fiber laser, Optics Letters, Dec. 1, 1998, pp. 1837-1839, vol. 23, No. 23.
Stuart D. Jackson et al., CW Operation of a 1.064-um Pumped Tm-Ho-Doped Silica Fiber Laser, IEEE Journal of Quantum Electronics, Sep. 1998, pp. 1578-1587, vol. 34, No. 9.
Christian Ghisler et al., Tuning of a Tm3+ : Ho 3+ : Silica Fiber Laser at 2um, IEEE Journal of Quantum Electronics, Nov. 1995, pp. 1877-1879, vol. 31, No. 11.
W.A Clarkson et al., High-power cladding-pumped Tm-doped silica fiber laser with wavelength tuning from 1860 to 2090 nm, Optics Letters, Nov. 15, 2002, pp. 1989-1991, vol. 27, No. 22.
Kyunghwan Oh et al., Continuous-wave oscillation of thulium-sensitized holmium-doped silica fiber laser, Optics Letters, Feb. 15, 1994, pp. 278-280, vol. 19, No. 4.
Ashraf F. El-Sherif et al., High-peak-power operation of a Q-switched Tm3+-doped silica fiber laser operating near 2um, Optics Lettters, Jan. 1, 2003, pp. 22-24, vol. 28, No. 1.
Stuart D. Jackson et al., Dynamics of the output of heavily Tm-doped double-clad silica fiber lasers, L. Opt. Soc. Am., Dec. 1999, pp. 2178-2188, vol. 16, No. 12.
L. Esterowitz, Diode-pumped holium, thulium, and erbium lasers between 2 and 3um operating cw at room temperature, Optical Engineering, Jun. 1990, pp. 676-680, vol. 29(6).

* cited by examiner

*Primary Examiner*—Minsun Oh Harvey
*Assistant Examiner*—Tuan N. Nguyen
(74) *Attorney, Agent, or Firm*—Eric A. Gifford (57) ABSTRACT

A heavy metal oxide glass selected from germanate, tellurite and bismuth oxide glasses provides a host for highly efficient Thulium doped 2 μm oxide glass and fiber lasers. The concentration of Thulium ions is high enough that energy transferred by the phenomenon of cross-relaxation will enhance laser emission at 2 μm and suppress emission at 1.5 μm so that 2 μm emission is dominant.

29 Claims, 7 Drawing Sheets

Fig. 1

| Host Glass | Host | Modifier ($K_2O$, $Na_2O$, $Li_2O$, $BaO$, $CaO$, $MgO$, $ZnO$, $Y_2O_3$, $PbO$) | Intermediator ($Al_2O_3$, $B_2O_3$, $La_2O_3$) | Thulium ions |
|---|---|---|---|---|
| Germanate | $GeO_2$ (30-90 wt. %), (40-80 wt. %) | (1-60 wt. %) (5-40 wt. %) | (0-50 wt. %) (5-30 wt. %) | $2 \times 10^{20}$ ions/cm³ $4 \times 10^{20}$ ions/cm³ |
| Tellurite | $TeO_2$ (30-90 wt. %), (40-80 wt. %) | (1-60 wt. %) (5-40 wt. %) | (0-50 wt. %) (5-30 wt. %) | $2 \times 10^{20}$ ions/cm³ $4 \times 10^{20}$ ions/cm³ |
| Bismuth | $Bi_2O_3$ (20-90 wt. %), (30-70 wt. %) | (1-60 wt. %) (5-40 wt. %) | (0-50 wt. %) (5-30 wt. %) | $2 \times 10^{20}$ ions/cm³ $4 \times 10^{20}$ ions/cm³ |

| Name | Glass Composition (Weight %) | | | | |
|---|---|---|---|---|---|
| | $GeO_2$ | $Al_2O_3$ | BaO | $Na_2O$ | $Tm_2O_3$ |
| CG-S-1 | 61.7 | 7.4 | 17.3 | 6.7 | 7.0 |
| CG-S-3 | 61.8 | 7.4 | 17.3 | 6.7 | 6.8 |
| CG-S-4 | 66.0 | 7.9 | 18.5 | 7.2 | 0.5 |
| CG-S-5 | 65.7 | 7.8 | 18.4 | 7.1 | 1.0 |
| CG-S-6 | 65.0 | 7.7 | 18.2 | 7.1 | 2.0 |
| CG-S-7 | 63.7 | 7.6 | 17.8 | 6.9 | 4.0 |
| CG-S-8 | 62.3 | 7.4 | 17.4 | 6.8 | 6.0 |
| CG-S-9 | 61.0 | 7.3 | 17.1 | 6.6 | 8.0 |
| CG-S-10 | 59.7 | 7.1 | 16.7 | 6.5 | 10.0 |
| CG-S-17 | 61.7 | 7.3 | 17.3 | 6.7 | 7.0 |
| CG-S-18 | 62.4 | 7.4 | 17.5 | 6.8 | 5.9 |
| CG-S-19 | 62.4 | 7.4 | 17.5 | 6.8 | 5.9 |
| CG-S-20 | 62.4 | 7.4 | 17.5 | 6.8 | 5.9 |
| CGS-21 | 62.4 | 7.4 | 17.5 | 6.8 | 5.9 |
| CGS-22 | 62.4 | 7.4 | 17.5 | 6.8 | 5.9 |
| CGS-23 | 62.4 | 7.4 | 17.5 | 6.8 | 5.9 |

| Name | Glass Composition (Weight %) | | | | | |
|---|---|---|---|---|---|---|
| | $Na_2O$ | $Al_2O_3$ | $B_2O_3$ | $TeO_2$ | $Tm_2O_3$ | |
| TT-1 | 7.4 | 8.11 | 8.31 | 76.18 | 0 | |
| TT-2 | 7.38 | 8.09 | 8.29 | 75.99 | 0.25 | |
| TT-3 | 7.36 | 8.07 | 8.27 | 75.8 | 0.5 | |
| TT-4 | 7.25 | 7.95 | 8.15 | 74.69 | 1.96 | |
| TT-5 | 7.18 | 7.87 | 8.07 | 73.96 | 2.92 | |
| TT-6 | 7.05 | 7.72 | 7.91 | 72.55 | 4.77 | |
| TT-7 | 6.92 | 7.58 | 7.76 | 71.2 | 6.54 | |
| | $K_2O$ | $Li_2O$ | $WO_3$ | $TeO_2$ | $Tm_2O_3$ | |
| TT-8 | 4.33 | 1.38 | 35.46 | 58.58 | 0.25 | |
| TT-9 | 2.33 | 2.58 | 35.67 | 58.92 | 0.5 | |
| TT-10 | 2.31 | 2.57 | 35.49 | 58.63 | 1 | |
| TT-11 | 2.29 | 2.54 | 35.14 | 58.05 | 1.98 | |

THULIUM-DOPED HEAVY METAL OXIDE GLASSES FOR 2UM LASERS

GOVERNMENT RIGHTS

The U.S. Government has a paid-up license in this invention and the right in limited circumstances to require the patent owner to license others on reasonable terms as provided for by the terms of Grant No. NNL04AB40P.

CROSS-REFERENCE TO RELATED APPLICATIONS

This application claims benefit of priority under 35 U.S.C. 120 to U.S. application Ser. No. 10/783,480 entitled "Single-Frequency Narrow Linewidth 2 µm Fiber Laser" filed on Feb. 19, 2004 and issued as U.S. Pat. No. 7,106,762 on Sep. 12, 2006, the entire contents of which are incorporated by reference.

BACKGROUND OF THE INVENTION

1. Field of the Invention

This invention relates to glasses and fibers for laser applications and more specifically to Thulium-doped heavy metal oxide glasses for near 2 µm lasers with high quantum efficiency.

2. Description of the Related Art

2 µm lasers are highly transmissive in air, relatively eye-safe, and highly absorptive in many natural substances such as organic tissue and water. Applications such as LIDAR, range finder, materials processing, and biomedical require low cost, robust and efficient 2 µm, e.g. typically 1.7-2.1 µm, lasers. As used herein the term "2 µm" laser refers to laser emission across the range of 1.7-2.1 µm.

Most 2 µm Thulium doped lasers use a crystalline host material. Crystalline materials exhibit good mechanical strength and chemical durability and through a phenomenon known as "cross-relaxation" exhibit high quantum efficiency. Unfortunately crystalline materials are expensive and cannot be pulled into fibers, hence can only be used for free space solid-state lasers.

Glass hosts, namely silica and fluoride glass, which can be pulled into fiber, have been developed for 2 µm fiber lasers. Unfortunately, neither glass is a good host for Thulium doped laser applications. Silica glass has high phonon energy, approximately 1100 $cm^{-1}$, and can only support limited doping concentrations, and thus exhibits poor quantum efficiency. Although fluoride exhibits low phonon energy of about 700 $cm^{-1}$ and accept high rare-earth doping concentrations, fluoride glass is physically weak and chemically not durable, which limits the output power of the laser and seriously restricts practical application.

SUMMARY OF THE INVENTION

The present invention provides a host for highly efficient Thulium doped 2 µm oxide glass and fiber lasers.

This is accomplished with a heavy metal oxide glass host selected from germanate, tellurite and bismuth oxide glasses. The host is heavily doped with Thulium ions, suitably at least $2 \times 10^{20}$ ions/$cm^3$, and preferably at least $4 \times 10^{20}$ ions/$cm^3$. Most typically, the Thulium ions will be introduced into the host glass as Thulium oxide of at least 2 wt. %, and preferably at least 4 wt. % to achieve the necessary ion concentrations and increase quantum efficiency. The concentration of Thulium ions is high enough that energy transferred by the phenomenon of cross-relaxation will enhance laser emission at 2 µm and suppress emission at 1.5 µm so that 2 µm emission is dominant. The quantum efficiency is preferably at least 100%, and most preferably at least 150%.

In one embodiment, a germanate glass host comprises germanium oxide ($GeO_2$) from 30% to 90% by weight, and preferably 40% to 80% by weight.

In a second embodiment, a tellurite glass host comprises tellurite oxide ($TeO_2$) from 30% to 90% by weight, and preferably 40% to 80% by weight.

In a third embodiment, a bismuth glass host comprises bismuth oxide ($Bi_2O_3$) from 20% to 90% by weight, and preferably 30% to 70% by weight.

In a fourth embodiment, the glass host further comprises a glass network modifier (MO) selected from $K_2O$, $Na_2O$, $Li_2O$, BaO, CaO, MgO, ZnO, $Y_2O_3$, PbO, or combinations thereof from 1% to 60% by weight, and preferably 5% to 40%, and a glass network intermediator (XO) selected from $Al_2O_3$, $B_2O_3$, $La_2O_3$ or combinations thereof from 0% to 50%, by weight, and preferably 5% to 30%.

DETAILED DESCRIPTION OF THE INVENTION

The present invention provides a host for highly efficient Thulium doped 2 µm oxide glass and fiber lasers.

Figure 1:
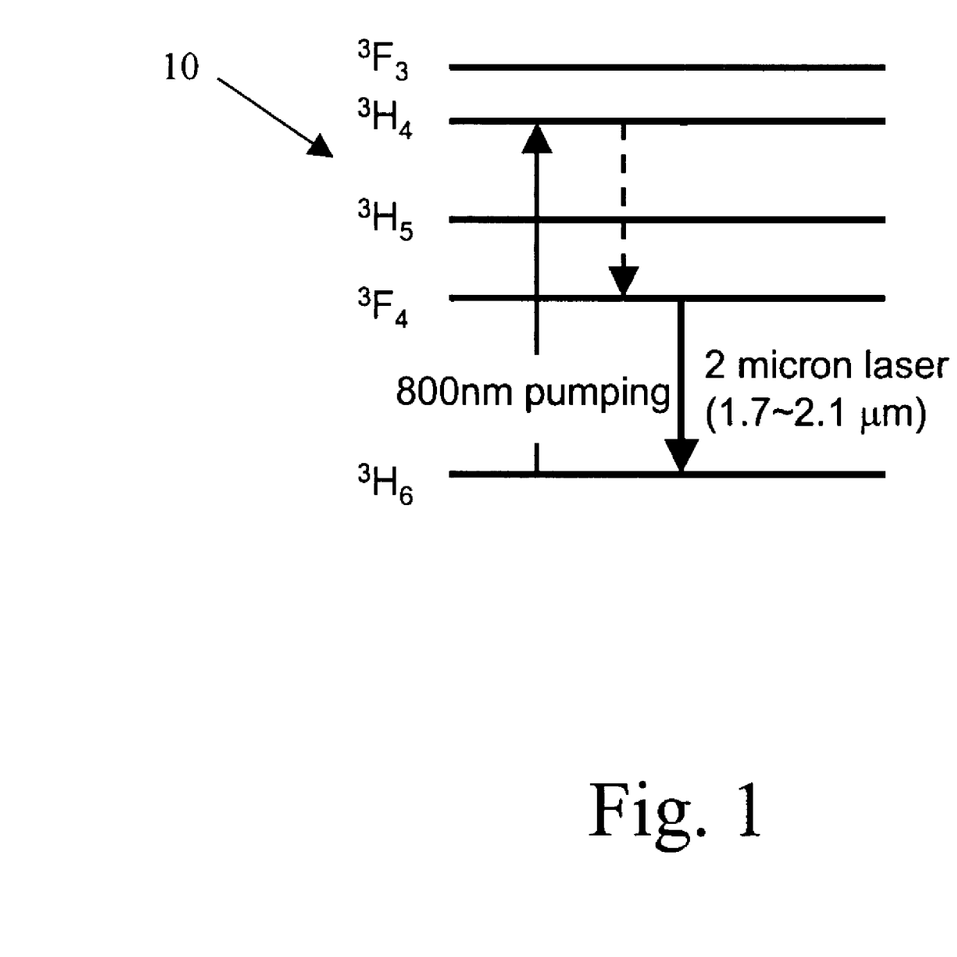
FIG. 1 is an energy level diagram of Thulium ions illustrating the phenomenon of cross-relaxation.

FIG. 1 shows a simplified energy level diagram 10 of triply ionized Thulium ions ($Tm^{3+}$). 2 µm laser oscillation of Thulium ions originates from $^3F_4$-$^3H_6$ transition. Typically Thulium ions are excited from a $^3H_6$ level (ground state) to a $^3H_4$ level by a pump beam, suitably 790 nm pump, and then decay to a $^3F_4$ level. It was reported in crystalline materials that the so-called cross-relaxation phenomenon can increase the quantum efficiency significantly. Thulium cross-relaxation is a non-radiative process in which an excited Thulium in the $^3H_4$ state (energy level around 12900 $cm^{-1}$) decays to the $^3F_4$ state (energy level around 6000 $cm^{-1}$) and a neighboring ground-state Thulium ion is promoted to the $^3F_4$ level, accompanied by the emission of phonons [L Esterowitz *Optical Engineering*, Vol. 29(6), 1990]. The advantage of this cross-relaxation process is that a single Thulium ion excited to the $^3H_4$ level generates two Thulium ions in the $^3F_4$ upper laser level. The quantum efficiency of pumping into the $^3F_4$ state is nearly 200%. The probability of $Tm^{3+}$ cross relaxation is negligible for concentrations less than approximately 2 wt % but approaches unity for concentrations greater than approximately 5 wt % in $Tm^{3+}$ doped crystals.

In accordance with the present invention, heavy metal oxide glasses and fibers are doped with a high concentration of Thulium ions. Heavy metal oxide glasses such as germanate, tellurite and bismuth oxide exhibit low phonon energy thereby providing a high quantum efficiency of $^3F_4$ level of Thulium ions. Critically, Thulium can be highly doped into these heavy metal oxide glasses. At these high dopant concentrations, the cross-relaxation phenomenon dramatically improves the quantum efficiency. For instance, germanate glass exhibits phonon energy of 900 cm$^{-1}$, which is much lower than silica glass of 1100 cm$^{-1}$. The doping concentration of Thulium ions in germanate glass can be up to 15 weight percent. In addition to high quantum efficiency, these glasses exhibit good mechanical properties and can be pulled into fibers.

Figure 2:
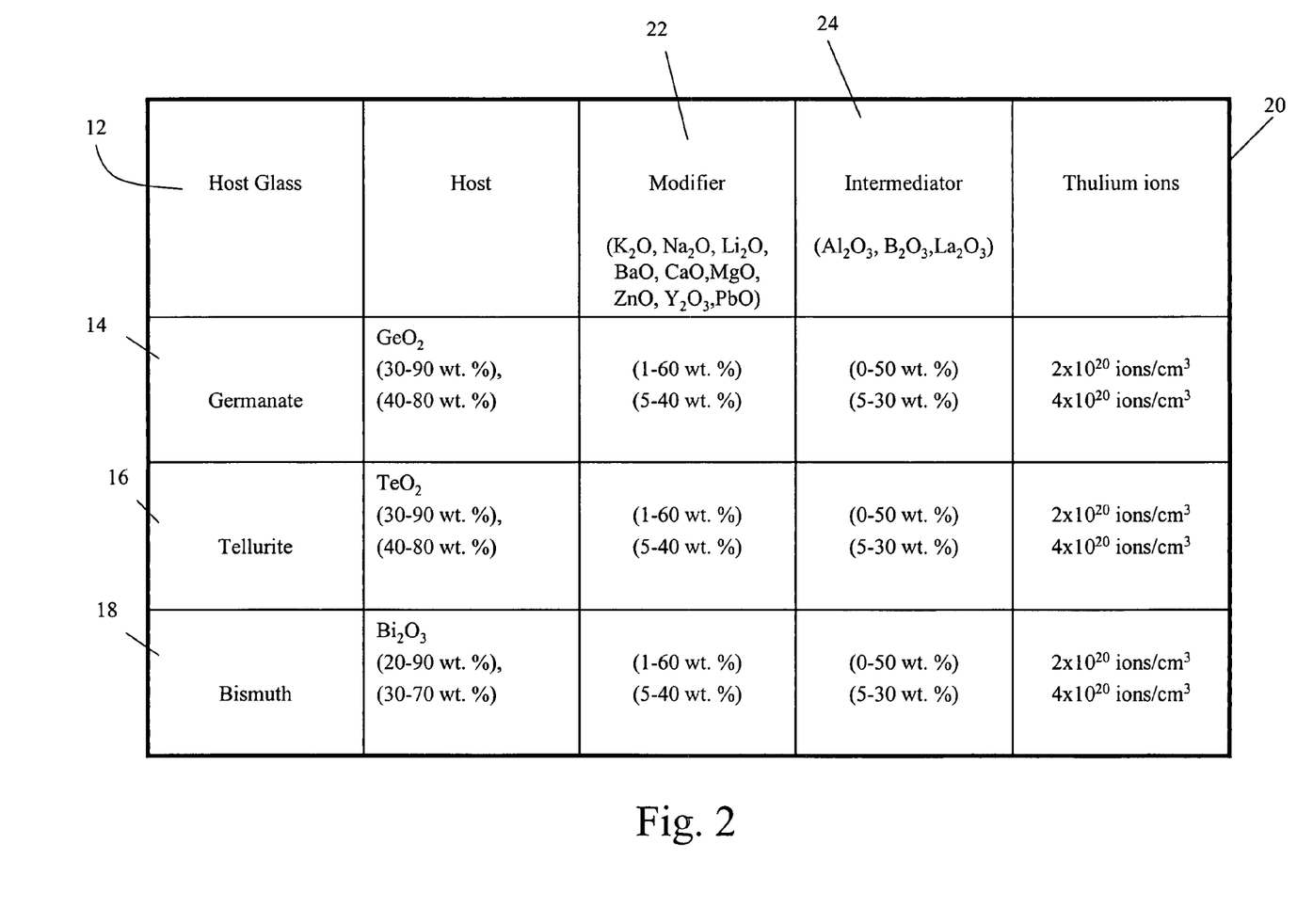
FIG. 2 is a table of Thulium doped heavy metal oxide glass compositions in accordance with the present invention.

As shown in FIG. 2, a heavy metal oxide glass host 12 selected from germanate glass 14, tellurite glass 16 and bismuth glass 18 is heavily doped with Thulium ions 20, suitably at least $2 \times 10^{20}$ ions/cm$^3$, and preferably at least $4 \times 10^{20}$ ions/cm$^3$ to increase quantum efficiency. The concentration of Thulium ions is high enough that most energy will be transferred to the lasing up-level of $^3F_4$ by cross-relaxation energy transfer ($^3H_4$, $^3H_6 \rightarrow ^3F_4$, $^3F_4$) instead of radiative decay ($^3H_4 \rightarrow ^3F_4$) thereby enhancing laser emission at 2 μm and suppressing emission at 1.5 μm so that 2 μm emission is dominant. The quantum efficiency is preferably at least 100%, and most preferably at least 150%. Thulium ions can be introduced into glasses and fibers with Thulium oxide, Thulium fluoride or other format. Most typically the ions are introduced with Thulium oxide of least 2 wt. %, and preferably at least 4 wt. % to achieve the desired ion concentration.

In one embodiment, germanate glass host 14 comprises germanium oxide (GeO$_2$) from 30% to 90% by weight, and preferably 40% to 80% by weight.

In a second embodiment, tellurite glass host 16 comprises tellurite oxide (TeO$_2$) from 30% to 90% by weight, and preferably 40% to 80% by weight.

In a third embodiment, bismuth glass host 18 comprises bismuth oxide (Bi$_2$O$_3$) from 20% to 90% by weight, and preferably 30% to 70% by weight.

In each embodiment, the glass host further comprises a glass network modifier (MO) 22 selected from K$_2$O, Na$_2$O, Li$_2$O, BaO, CaO, MgO, ZnO, Y$_2$O$_3$, PbO, or combinations thereof from 1% to 60% by weight, and preferably 5% to 40%, and a glass network intermediator (XO) 24 selected from Al$_2$O$_3$, B$_2$O$_3$, La$_2$O$_3$ or combinations thereof from 0% to 50%, by weight, and preferably 5% to 30%.

Figure 3:
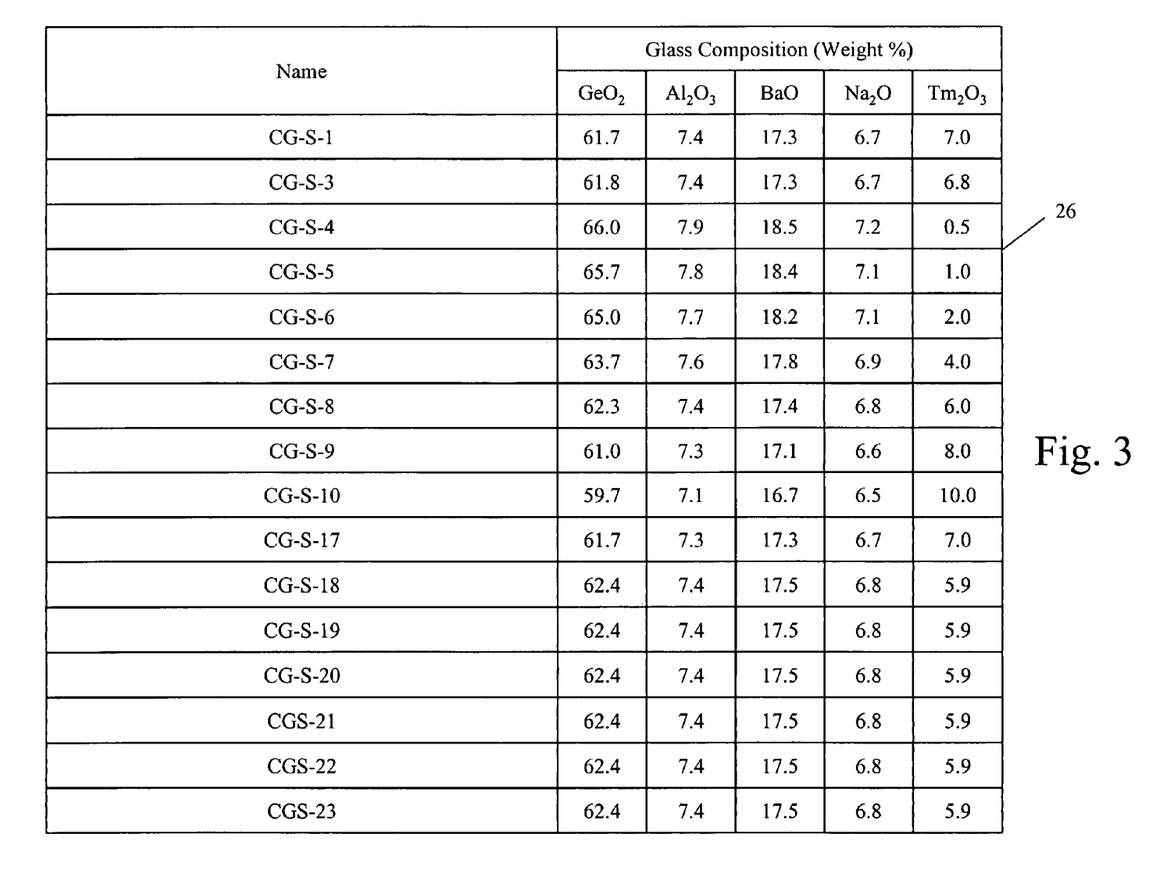
FIG. 3 is a table of Thulium doped germanate glasses.
Figure 4:
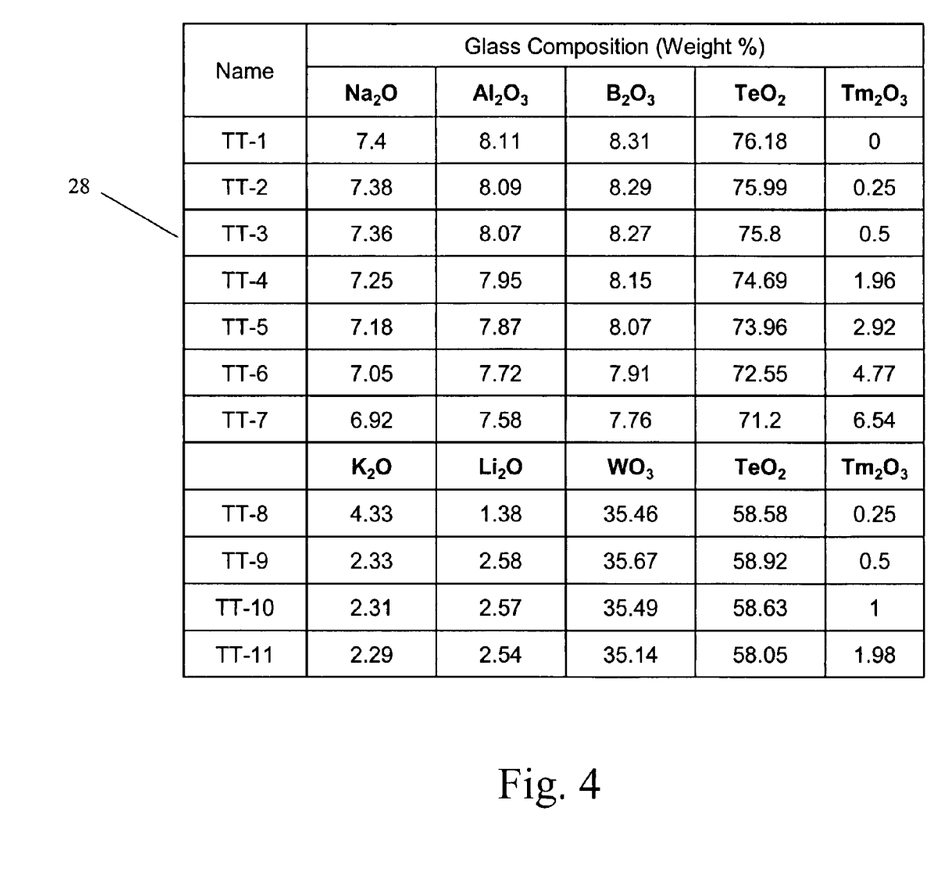
FIG. 4 is a table of Thulium doped tellurite glasses

FIGS. 3 and 4 are tables of Thulium doped germanate glasses 26 and tellurite glasses 28, respectively. In these samples, the Thulium ions are introduced with Thulium oxide (Tm$_2$O$_3$).

Figure 5:
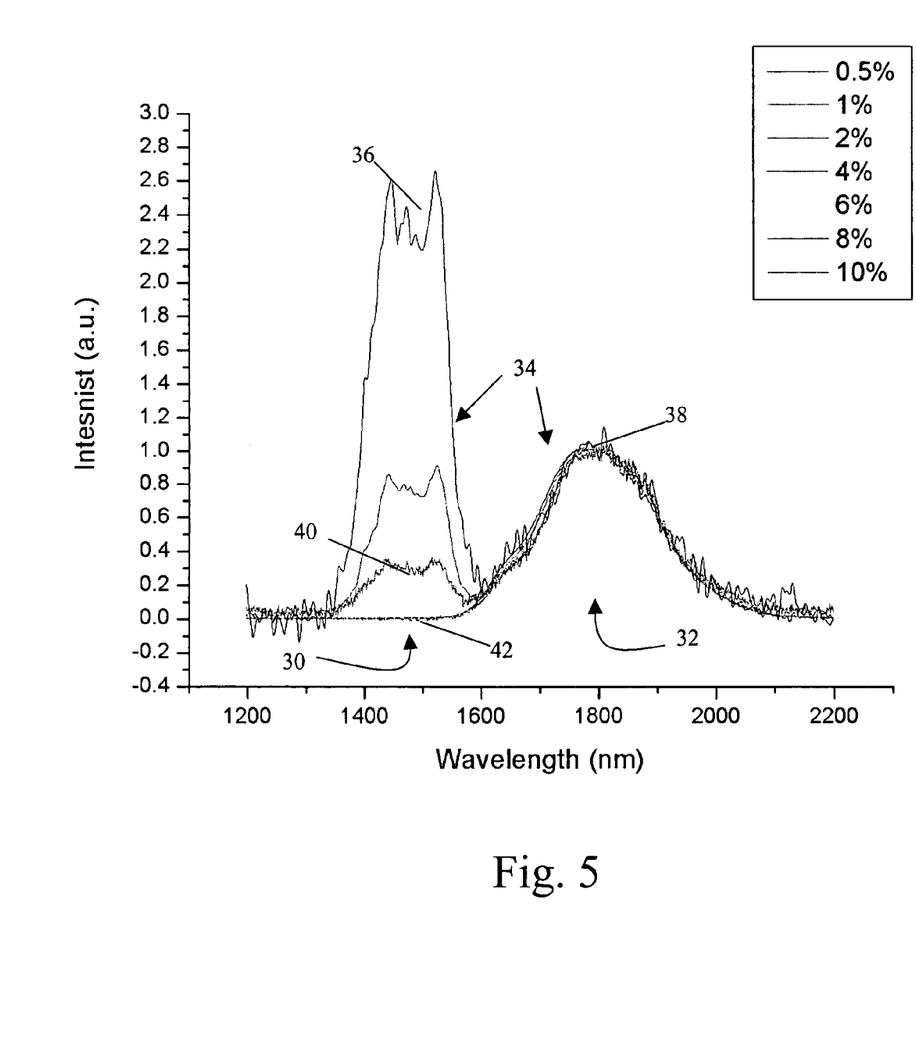
FIG. 5 is a normalized fluorescence spectra of a heavy metal oxide glass host doped with varying concentrations of Thulium ions.

The fluorescence properties of Thulium ions in the Thulium doped germanate glasses 26 are shown in FIG. 5. Two broad emission bands 30 at 1.49 μm and 32 at 1.8 μm in the fluorescence spectra 34 are due to $^3H_4 \rightarrow ^3F_4$ transition and $^3F_4 \rightarrow ^3H_6$ transition, respectively. To illustrate the relationship between doping concentration and relative fluorescence intensity of the "1.5 μm" and "2 μm" emission bands, the fluorescence spectra 34 at different doping concentrations from 0.5 to 10 wt. % were scaled so that the emission intensity at 1.8 μm was normalized to 1.

At low dopant concentrations, such as 0.5 wt %, the normalized emission intensity 36 of 1.49 μm band is much stronger than the normalized emission intensity 38 of 1.8 μm band. At high dopant concentrations, especially higher than 2 wt %, the normalized emission intensity 38 of the 1.8 μm band is stronger than the normalized emission intensity 40 of the 1.49 μm band. Above 4 wt %, the 1.8 μm band emission dominates the fluorescence spectrum and the emission intensity 42 of the 1.49 μm band is highly suppressed.

At low concentrations, the emission intensity of the 1.49 μm band is much stronger than the emission intensity of 1.8 μm band because of the high rate of non-radiative decay caused by high phonon energy. A high doping concentration enhances the $^3F_4 \rightarrow ^3H_6$ transition (1.8 μm) while suppressing the $^3H_4 \rightarrow ^3F_4$ transition (1.47 μm). The reason for this phenomenon is cross-relaxation: One Tm$^{3+}$ ion at energy level of $^3H_4$, jumps to the lower level of $^3F_4$, by exciting another Tm$^{3+}$ ion from the level of $^3H_6$ to the level of 3F$_4$ and generating one or two phonons. So two Tm$^{3+}$ ions will be excited to the upper laser level by absorbing one pumping photon, which makes Tm$^{3+}$ (under high concentration circumstance) have high quantum efficiency at 2 μm emission region.

Since cross-relaxation transfer process is based on electric multipolar interaction mechanism, the distance between the Tm$^{3+}$ ions (i.e. doping concentration) is very critical. FIG. 5 shows that there was almost no fluorescence of the $^3H_4 \rightarrow ^3F_4$ transition, when the doping concentration was higher than 4 wt %. That means the rate of cross-relaxation is much bigger than the spontaneous emission rate of $^3H_4 \rightarrow ^3F_4$ transition at high Tm$^{3+}$ doping level. So when the Tm$^{3+}$ doping level is higher than 4%, the cross-relaxation becomes the dominant channel to populate the upper level of a 2 μm laser ($^3F_4$) and the pumping efficiency is significantly improved.

Figure 6:
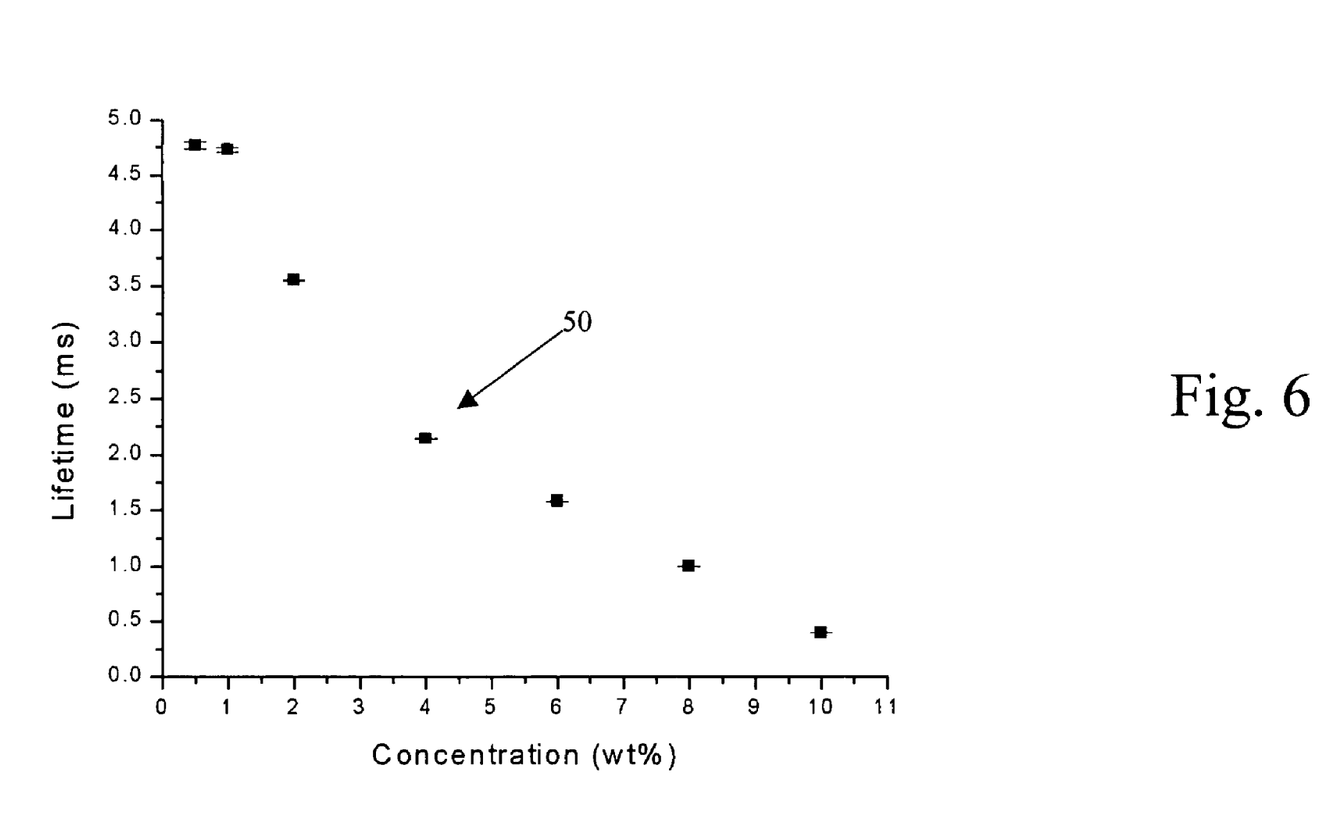
FIG. 6 is a plot of emission lifetime of Thulium ions at varying concentrations.

As shown in FIG. 6, the lifetime 50 of the $^3F_4$ level of Tm$^{3+}$ drops from 4.77 ms to 0.4 ms with the increase of doping concentration from 0.5 wt. % to 10 wt. %. Lifetime is defined as the time required for the fluorescence to decrease to 1/e of its initial intensity. One reason is that when the doping concentration increases, reverse energy transfer ($^3F_4$, $^3F_4 \rightarrow ^3H_4$, $^3H_6$) will occur. When two excited Tm$^{3+}$ ions at $^3F_4$ level are close enough, they will interact. One ion will nonradiatively decay to the ground state while the other ion will be excited to the $^3H_4$ level. Since this is a phonon-absorbing energy transfer process, its probability is much lesser than the probability of cross-relaxation which is a phonon-emitting process, because $$\left(\frac{n+1}{n}\right)^N \gg 1$$

where n is the Bose-Einstein occupation number, n+1 and n are the probability of generating one phonon and absorbing one phonon. Another reason is that the emigration between ions at $^3F_4$ level results in energy transfer to the glass defect. FIG. 6 shows that for low doping concentrations (less than 1%), the lifetime of $^3F_4$ is only slightly reduced with increased doping. Therefore, at low doping levels both the glass defect and reverse energy transfer can be neglected. As the doping level continues to increase beyond 1%, the lifetime drops sharply. After the doping concentration is larger than 4%, the slope of decreasing the lifetime becomes smaller.

Thulium Doped 2 μm Fiber Laser

Figure 7:
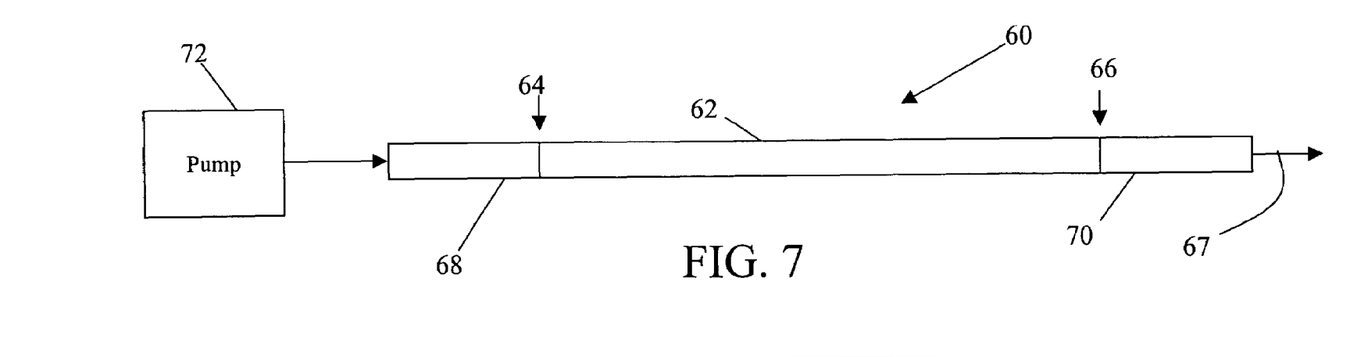
FIG. 7 is a diagram of a Thulium doped 2 µm fiber laser.

As shown in FIG. 7, a 2 μm fiber laser 60 includes a gain fiber 62, single or multi mode, formed of a heavy metal oxide glass (germanate, tellurite, bismuth) host doped with triply ionized thulium oxide. Reflectors 64 and 66 are positioned at opposite ends of gain fiber 62 to form a resonant cavity that provides the feedback necessary to sustain laser emission 67. A free space laser can be similarly configured using a block of Tm-doped heavy metal oxide glass and free space reflectors.

The reflectors may be formed by coating the ends of fibers 68,70 and butt-coupling them to gain fiber 62, as shown, or by using coated mirrors or fiber gratings in sections of passive fiber butt coupled or fused to the ends of gain fiber 62. The reflectivity of reflector 64 should be as close to 100% as possible to increase the efficiency of the laser. The reflectivity of reflector 66 is less than 100%, suitably 2-99% depending upon the pump power and target output power, such that power can be extracted from the cavity. Laser emission 67 can be either single and multi-transverse mode or single and multi-longitudinal mode depending upon the cavity design, e.g. length and gratings.

A pump 72, e.g. a single-mode or multi-mode laser diode, illuminates gain fiber 62 at a wavelength, typically 800 nm, within the absorption band. The pump may be end-coupled, as shown, side-coupled or coupled at the output end via a WDM. The absorption band of triply ionized thulium occurs from 750 to 820 nm. Pumping of the doped glass populates the thulium upper level creating a population inversion. Spontaneous emission catalyzes the stimulated emission of the thulium ions in the upper level over a range of 1800 to 2000 nm. This emission is enhanced by the cross-relaxation effect as described above. The emission peak of thulium occurs at a wavelength of approximately 1800 nm.

Figure 8:
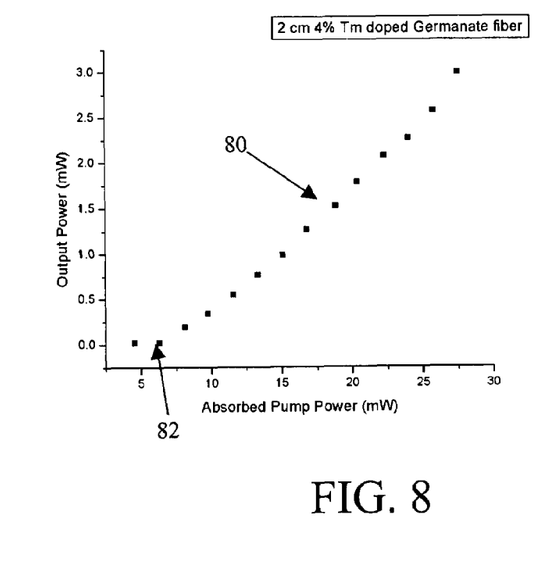
FIG. 8 is a plot of output power versus absorbed pump power for a 4 wt. % Tm-doped germanate fiber laser.

The output slope characteristic 80 (output power vs. absorbed pump power) for a 2 µm fiber laser is shown in FIG. 8. In this particular example, the gain fiber was a 2 cm long double-clad fiber having a core diameter of 7 µm designed for use with a commercially available multi-mode 804 nm diode pump laser. The core host and inner cladding glasses were similar in composition to the germanate glasses listed in FIG. 3. The core host was doped with 4 wt. % thulium-oxide.

The inner cladding, which is matched to the core glass with a numerical aperture (NA) of 0.15 confines the 2 µm laser in the core. The outer cladding, which is matched to the inner cladding with a high NA, confines the pump laser in the inner cladding. A silicate glass was used as the outer cladding glass due to its low cost, low refractive index and better chemical and thermal stabilities. The fluorescence lifetime of the transition $^3F_4$-$^3H_6$ (1.87 µm) was measured to be 1.6 ms.

Two dielectric coated SMF-28 silica fibers were used as mirrors to form the fiber laser cavity. The reflectivities of the mirrors were 96.4% (high reflectivity) and 82% (partial reflectivity, output coupler), respectively, around 1.9 µm. The transmission of the HR mirror at the pumping wavelength is 93.9%. The propagation loss of the fiber was measured to be 0.05 dB/cm. The coupling loss between the Thulium doped fiber and coated SMF-28 was measured as 0.79 dB.

As shown FIG. 8, the threshold absorbed power 82 was about 7.6 mW, which is quite low due to the high reflectivity of both cavity mirrors. The slope efficiency with respect to the absorbed pump power was 14.1%, which is quite high considering the high reflectivity of the output coupler.

Koechaner's model for slope efficiency of 3-level laser systems was used to calculated the quantum efficiency of the material, $$\sigma = \frac{P_{out}}{P_{absorbed}} = \frac{(1-L_N)(1-R_{PR})}{L-\ln R_{PR}} \eta_Q \frac{\lambda_{pump}}{\lambda_{Laser}} \quad L_N = \frac{L-\ln R_{PR}}{2\alpha_0^l}$$

$$L = 2\alpha l - \ln R_{HR}$$

$\sigma$ is the slope efficiency. $\eta_Q$ is the quantum efficiency, defined as number of emission photons generated by one pump laser photon. $\lambda_{pump}$, $\lambda_{Laser}$ are the wavelength of the pump and laser. $2\alpha l$ is used to describe the round trip loss of the laser cavity except for loss of two cavity mirrors. $R_{HR}$, $R_{PR}$ are the reflectivity of the cavity mirror. In this experiment, both the HR mirror and PR mirror were positioned very close to the end of the gain fiber, so the only loss of the cavity results from the propagation loss, which is 0.054 dB/cm.

According to Koechaner's model, the calculated value of quantum efficiency of the fiber laser is 170%, which means every absorbed pump photon will generate 1.7 emission photons. In a cross-relaxation process, the theoretical maximum quantum efficiency is 200% instead of the traditional value of 100%. Such a high quantum efficiency of 170% is due to the high cross-relaxation energy transfer rate, which primarily depends on the doping concentration of $Tm^{3+}$ ions, and is the highest quantum efficiency reported in $Tm^{3+}$-doped glasses. Another advantage of cross-relaxation is that the phenomenon does not generate a lot of phonons compared with other non-radiative decay processes. This is a very important feature especially for high power applications, in which thermal problems become the bottleneck on laser performance.

I claim:

1. A laser glass comprising a heavy metal oxide glass host, a glass network modifier (MO) selected from $K_2O$, $Na_2O$, $Li_2O$, $BaO$, $CaO$, $MgO$, $ZnO$, $Y_2O_3$, $PbO$, or combinations thereof from 5% to 40% by weight, and a glass network intermediator (XO) selected from $Al_2O_3$, $B_2O_3$, $La_2O_3$ or combinations thereof from 5% to 30%, by weight, said glass doped with Thulium ions being responsive to pump light to emit laser light on the $^3F_4$ to $^3H_6$ transition of the thulium ions.

2. The laser glass of claim 1, wherein the glass host comprises one of germanium oxide ($GeO_2$), Tellurite oxide ($TeO_2$) and bismuth oxide ($Bi_2O_3$).

3. The laser glass of claim 2, wherein the glass host comprises germanium oxide ($GeO_2$) from 30% to 90% by weight.

4. The laser glass of claim 3, wherein the glass host comprises germanium oxide ($GeO_2$) from 40% to 80% by weight.

5. The laser glass of claim 2, wherein the glass host comprises tellurite oxide ($TeO_2$) from 30% to 90% by weight.

6. The laser glass of claim 5, wherein the glass host comprises tellurite oxide ($TeO_2$) from 40% to 80% by weight.

7. The laser glass of claim 2, wherein the glass host comprises bismuth oxide ($Bi_2O_3$) from 20% to 90% by weight.

8. The laser glass of claim 7, wherein the glass host comprises bismuth oxide ($Bi_2O_3$) from 30% to 70% by weight.

9. The laser glass of claim 1, wherein the concentration of Thulium ions is at least $2\times10^{20}$ ions/cm$^3$.

10. The laser glass of claim 9, wherein the concentration of Thulium ions is at least $4\times10^{20}$ ions/cm$^3$.

11. The laser glass of claim 1, wherein the Thulium ions are introduced into the host glass as Thulium oxide of at least 2% by weight.

12. The laser glass of claim 11, wherein the Thulium oxide is at least 4% by weight.

13. The laser glass of claim 1, wherein the concentration of Thulium ions is high enough that most energy will be transferred to the lasing up-level of $^3F_4$ by cross-relaxation energy transfer ($^3H_4$, $^3H_6 \rightarrow ^3F_4$, $^3F_4$) instead of radiative decay ($^3H_4 \rightarrow ^3F_4$).

14. The laser glass of claim 1, wherein the concentration of Thulium ions is high enough to enhance laser emission on the $^3F_4$ to $^3H_6$ transition of the thulium ions and suppress emission on the $^3H_4 \rightarrow ^3F_4$ transition of the thulium ions.

15. A laser glass comprising a heavy metal oxide glass host doped with Thulium ions being responsive to pump light to emit laser light on the $^3F_4$ to $^3H_6$ transition of the thulium ions, wherein the glass host comprises one of germanium oxide (GeO$_2$), Tellurite oxide (TeO$_2$) and bismuth oxide (Bi$_2$O$_3$), a glass network modifier (MO) selected from K$_2$O, Na$_2$O, Li$_2$O, BaO, CaO, MgO, ZnO, Y$_2$O$_3$, PbO, or combinations thereof from 5% to 40% by weight, and a glass network intermediator (XO) selected from Al$_2$O$_3$, B$_2$O$_3$, La$_2$O$_3$, or combination thereof from 5% to 30%, by weight.

16. A laser, comprising:
a pump for emitting pump light; and
a laser cavity containing a laser glass formed of a thulium-doped heavy metal oxide glass host, said laser glass being responsive to the pump light to emit laser light on the 3F4 to 3H6 transition of the thulium ions and suppress emission on the 3H4→3F4 transition of the thulium ions,
wherein said laser glass further comprises a glass network modifier (MO) selected from K$_2$O, Na$_2$O, Li$_2$O, BaO, CaO, MgO, ZnO, Y$_2$O$_3$, PbO, or combinations thereof from 5% to 40% by weight, and a glass network intermediator (XO) selected from Al$_2$O$_3$, B$_2$O$_3$, La$_2$O$_3$, or combination thereof from 5% to 30%, by weight.

17. The laser of claim 16, wherein the quantum efficiency of the laser is at least 150%.

18. The laser of claim 16, wherein the laser glass is pulled into a fiber.

19. The laser of claim 16, wherein the glass host comprises one of germanium oxide (GeO$_2$), Tellurite oxide (TeO$_2$) and bismuth oxide (Bi$_2$O$_3$) from 20% to 90% by weight.

20. The laser of claim 16, wherein the Thulium ions are introduced into the host glass as Thulium oxide of at least 2% by weight.

21. The laser of claim 20, wherein the Thulium oxide is at least 4% by weight.

22. The fiber of claim 21, wherein the glass host comprises one of germanium oxide (GeO$_2$), Tellurite oxide (TeO$_2$) and bismuth oxide (Bi$_2$O$_3$) from 20% to 90% by weight.

23. The fiber of claim 21, wherein the concentration of Thulium ions is at least $4\times10^{20}$ ions/cm$^3$.

24. The fiber of claim 21, wherein the Thulium ions are introduced into the host glass as Thulium oxide of at least 4% by weight.

25. The fiber of claim 21, wherein the concentration of Thulium ions is high enough to enhance laser emission on the $^3F_4$ to $^3H_6$ transition of the thulium ions and suppress emission on the $^3H_4 \rightarrow ^3F_4$ transition of the thulium ions.

26. A laser, comprising:
a pump for emitting pump light; and
a laser cavity containing a laser glass formed of thulium-doped heavy metal oxide glass, said laser glass being responsive to the pump light to emit laser light on the $^3F_4$ to $^3H_6$ transition of the thulium ions and suppress emission on the $^3H_4 \rightarrow ^3F_4$ transition of the thulium ions,
wherein said laser glass host comprises one of germanium oxide (GeO$_2$), Tellurite oxide (TeO$_2$) and bismuth oxide (Bi$_2$O$_3$), from 20% to 90% by weight, a glass network modifier (MO) selected from K$_2$O, Na$_2$O, Li$_2$O, BaO, CaO, MgO, ZnO, Y$_2$O$_3$, PbO, or combinations thereof from 5% to 40% by weight, and a glass network intermediator (XO) selected from Al$_2$O$_3$, B$_2$O$_3$, La$_2$O$_3$, or combination thereof from 5% to 30% by weight.

27. The laser of claim 16, wherein the concentration of Thulium ions is at least $2\times10^{20}$ ions/cm$^3$.

28. The laser of claim 27, wherein the concentration of Thulium ions is at least $4\times10^{20}$ ions/cm$^3$.

29. A fiber, comprising:
a core formed from a heavy metal oxide glass host doped with Thulium ions, a glass network modifier (MO) selected from K$_2$, Na$_2$O, Li$_2$O, BaO, CaO, MgO, ZnO, Y$_2$O$_3$, PbO, or combinations thereof from 5% to 40% by weight, and a glass network intermediator (XO) selected from Al$_2$O$_3$, B$_2$O$_3$, La$_2$O$_3$, or combination thereof from 5% to 30%, by weight, and
a cladding formed from the same heavy metal oxide glass host,
said fiber being responsive to pump light to emit laser light on the $^3F_4$ to $^3H_6$ transition of the thulium ions.

* * * * *